United States Patent
McGaughey (10) Patent No.: US 9,651,984 B2
(45) Date of Patent: May 16, 2017

(54) FEED-FORWARD TIME TRANSFER MECHANISM FOR TIME SYNCHRONIZATION

(71) Applicant: Cisco Technology, Inc., San Jose, CA (US)

(72) Inventor: Johnston Reid McGaughey, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 122 days.

(21) Appl. No.: 14/570,232

(22) Filed: Dec. 15, 2014

(65) Prior Publication Data

US 2016/0170441 A1    Jun. 16, 2016

(51) Int. Cl.
*G06F 1/00* (2006.01)
*G06F 1/12* (2006.01)
*H04L 29/08* (2006.01)
*H04L 29/06* (2006.01)

(52) U.S. Cl.
CPC ............ *G06F 1/12* (2013.01); *H04L 67/125* (2013.01); *H04L 67/42* (2013.01)

(58) Field of Classification Search
CPC ......... G06F 1/12; H04L 67/125; H04L 12/56; H04L 12/26; H04J 3/0658; H04W 56/00
USPC ........ 370/236, 252, 503, 228, 390; 375/354; 348/397.1
See application file for complete search history.

(56) References Cited

U.S. PATENT DOCUMENTS

| | | | |
|---|---|---|---|
| 6,954,432 B1* | 10/2005 | Bychowsky | H04W 56/00 370/236 |
| 7,474,624 B2* | 1/2009 | Grossman | H04L 12/2801 348/397.1 |
| 9,271,247 B1* | 2/2016 | Pearson | H04W 56/00 |
| 2008/0049633 A1* | 2/2008 | Edwards | H04L 43/0852 370/252 |
| 2008/0168182 A1* | 7/2008 | Frank | G06F 1/12 709/248 |
| 2009/0245249 A1* | 10/2009 | Suzuki | H04L 12/18 370/390 |

(Continued)

OTHER PUBLICATIONS

"RADclock" CUBINlab—Department of Electrical and Electronic Engineering, http://www.cubinlab.ee.unimelb.edu.au/radclock/, May 4, 2007, 1 page, The University of Melbourne, Australia.

(Continued)

*Primary Examiner* — Aurel Prifti
(74) *Attorney, Agent, or Firm* — Parker Ibrahim & Berg LLC; James M. Behmke; Stephen D. LeBarron (57) ABSTRACT

A feed-forward, time transfer mechanism is provided for time synchronization in a computer network. A device in a network receives a timestamp from a time synchronization master of the device that is associated with a clock message from the master. The device generates a new clock message for one or more slaves of the device and sends a new timestamp associated with the new clock message to the one or more slaves that is based on the timestamp received from the master, a determined amount of transmission delay between the device and the master, and an elapsed time between when the device received the clock message from the master and when the device generated the new clock message for the one or more slaves.

20 Claims, 10 Drawing Sheets

(56) References Cited

U.S. PATENT DOCUMENTS

| | | | |
|---|---|---|---|
| 2013/0077509 A1* | 3/2013 | Hirota | H04L 47/56 370/252 |
| 2013/0121142 A1* | 5/2013 | Bai | H04L 12/1868 370/228 |
| 2013/0223458 A1* | 8/2013 | Bui | H04J 3/0658 370/503 |
| 2014/0056318 A1* | 2/2014 | Hansson | H04J 3/0667 370/503 |
| 2014/0301513 A1* | 10/2014 | Takahashi | G06F 1/12 375/354 |

OTHER PUBLICATIONS

"Feed forward (control)", http://en.wikipedia.org/wiki/Feedforward_control, May 8, 2015, 5 pages, Wikimedia Foundation, Inc.

* cited by examiner

FEED-FORWARD TIME TRANSFER MECHANISM FOR TIME SYNCHRONIZATION

TECHNICAL FIELD

The present disclosure relates generally to computer networks, and, more particularly, to a feed-forward, time transfer mechanism for time synchronization.

BACKGROUND

Time synchronization among computing devices is an important criteria for many computing systems. In a simple case, time synchronization across devices may allow a network to enhance the security and fault detection services of the network. For example, a central networking device may receive notifications/alerts that include timestamps indicating when certain network conditions or events were detected by devices in the network (e.g., when an error occurred at a device, when a potential security breach was detected, etc.). If the reported timestamps are based on synchronized clocks across the devices, the central networking device can then draw parallels between reported events or alerts. For example, assume that a first device is dependent on a second device and that errors are detected at both devices. If the timestamps of the corresponding alerts are within a certain time period of one another, the central device may determine that failure at the second device is also causing the failure at the first device.

Another potential application for time synchronization is in computerized control systems. In such systems, a controller may receive sensor measurements regarding a controlled process and adjust the process, accordingly. The timing of when these operations occur (e.g., when the measurements are sent, when the control command is sent, etc.), as well as any potential communication delays in the network, thus require a uniform time base across the devices.

Despite the widespread applicability of time synchronization in computing systems, the precise control of timing mechanisms across computing devices remains challenging. In particular, effects such as frequency drift in the devices' clocks/oscillators may limit the degree of precision afforded by a time synchronization mechanism.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives a timestamp from a time synchronization master of the device that is associated with a clock message received from the master. The device determines an amount of transmission delay between the device and the master. The device generates a new clock message for one or more slaves of the device. The device determines an elapsed time between when the device received the clock message from the master and when the device generated the new clock message for the one or more slaves of the device. The device sends a new timestamp associated with the new clock message to the one or more slaves of the device. The new timestamp is based on the timestamp received from the master, the determined amount of transmission delay between the device and the master, and the elapsed time between when the device received the clock message from the master and when the device generated the new clock message.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
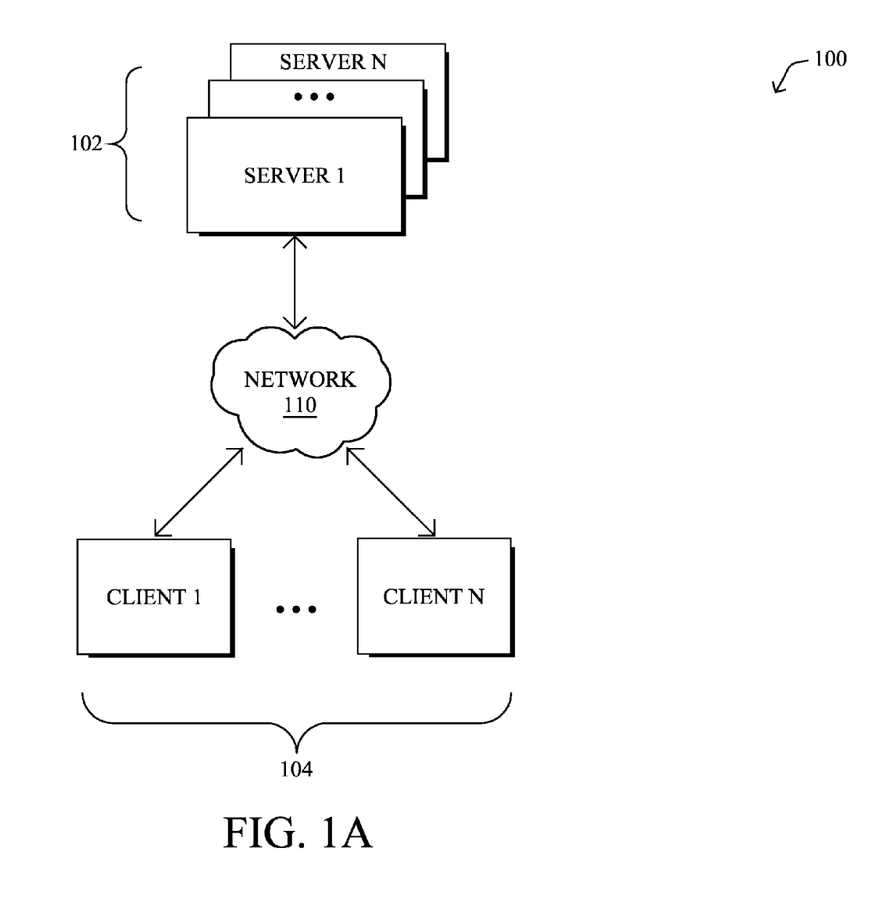
FIGS. 1A-1B illustrate an example computer system.

FIG. 1A is a schematic block diagram of an example computer system 100 illustratively comprising any number of servers 102 (e.g., a first through nth server) that communicate with any number of client devices 104 (e.g., a first through nth client) via a network 110. In general, servers 102 provide some form of computerized service to client devices 104. Such a service may be either on a pull basis (e.g., in response to receiving a request from one of client devices 104 for the service) or on a push basis (e.g., data is sent to one of client devices 104 by one of servers 102 without first receiving a request for the service). For example, according to various embodiments, server(s) 102 may provide a time synchronization service to client devices 104 that causes the local clocks of client devices 104 to be synchronized to a global network time (e.g., to a clock of one of the servers 102).

Network 110 may include any number of networking devices (e.g., routers, switches, intermediary servers, etc.)

that facilitate communications between servers 102 and client devices 104. For example, network 110 may include, but is not limited to, a LAN, WAN, wireless network, hardwired network, optical network, satellite network, combinations thereof, or the like. In addition, network 110 may employ any number of different communication protocols such as the Internet Protocol (IP), Multiprotocol Label Switching (MPLS), etc., that allow packets to be routed between servers 102 and client devices 104 via network 110.

Figure 1B:
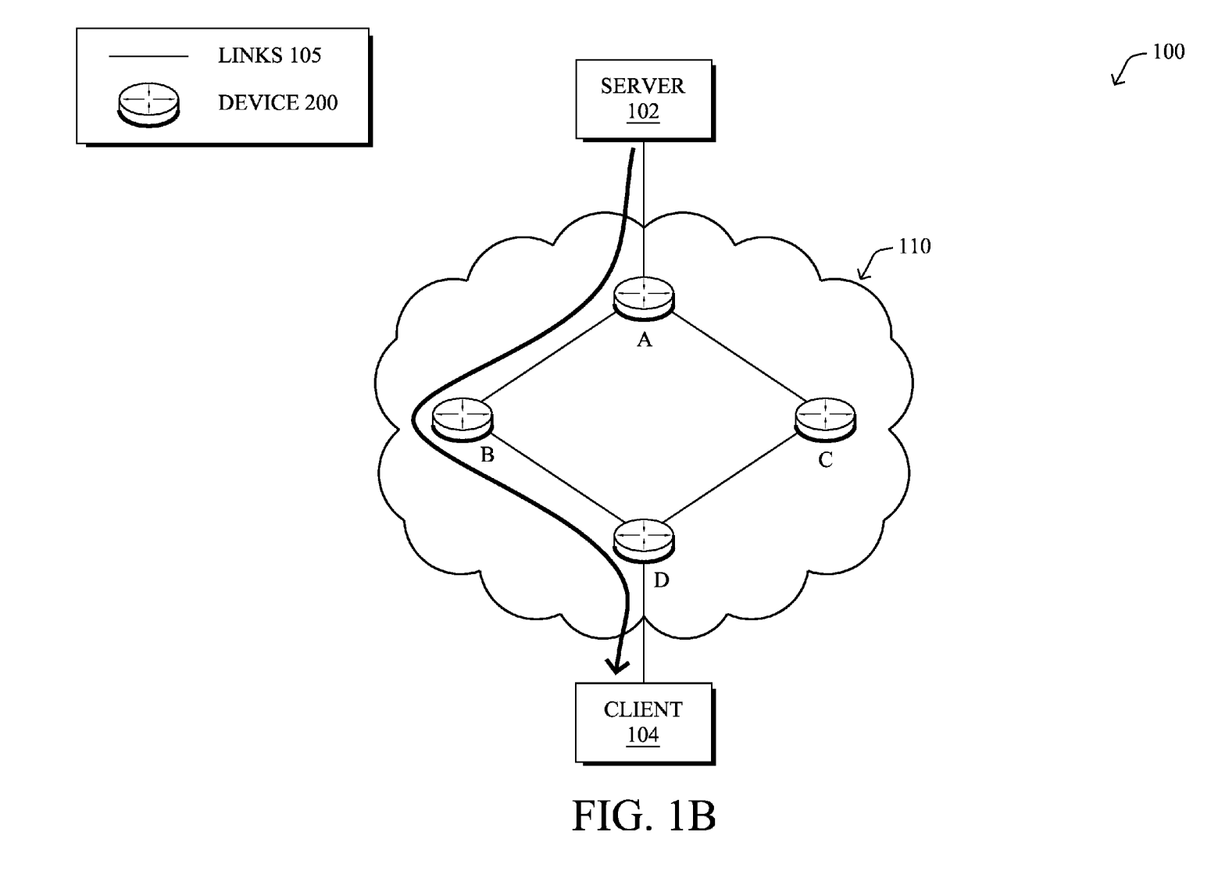

An example of network 110 is shown in greater detail in FIG. 1B. As shown, network 110 may include any number of network nodes/devices 200 (e.g., nodes "A," "B," "C," and "D" in the illustrative example) that interconnect a particular server 102 to a particular client 104 via networking links 105. For example, devices/nodes 200 may route data 106 from server 102 to client 104 via a path that includes nodes A, B, and D. Routing decisions may be made according to the routing protocol or protocols used in network 110, to select the path taken by data 106. For example, data 106 may also be routed to client device 104 via a different path that includes nodes A, C, and D. Accordingly, the routing protocol used in network 110 may select between the two paths based on factors such as the characteristics of the paths (e.g., delay, jitter, packet retransmission rates, etc.), the type of traffic (e.g., certain traffic may have guaranteed performance requirements), or the like.

According to various embodiments, the devices in computer system 100 may be configured to implement a time synchronization mechanism that functions to synchronize the internal clocks/timers of the devices. One example of such a synchronization mechanism is the Precision Time Protocol (PTP), which is defined in the 1588 standard promulgated by the Institute of Electrical and Electronics Engineers (IEEE), referred to herein generally as IEEE-1588. The original 1588 standard was released in 2002, but has since been replaced in 2008 by the document entitled "1588-2008—IEEE Standard for a Precision Clock Synchronization Protocol for Networked Measurement and Control Systems," also sometimes known as PTP version 2 (PTPv2).

Many time synchronization mechanisms use the concept of "master" and "slave" devices whereby the time kept by a slave device is controlled by a master device. For example, as shown in FIG. 1B, server 102 may act as a master device and broadcast time information to devices in network 110 including client device 104. In turn, client device 104 may be a slave device configured to adjust its internal timing mechanism based on the information received from server 102. In IEEE-1588 and similar implementations, the concept of a "grandmaster" is also introduced. Notably, a master device may itself be a slave of another device. For example, node D may be the master of client device 104 and also be the slave of node B. However, a grandmaster (e.g., server 102), in contrast to a master, does not act as a slave to any other device in the time synchronization mechanism.

Figure 2:
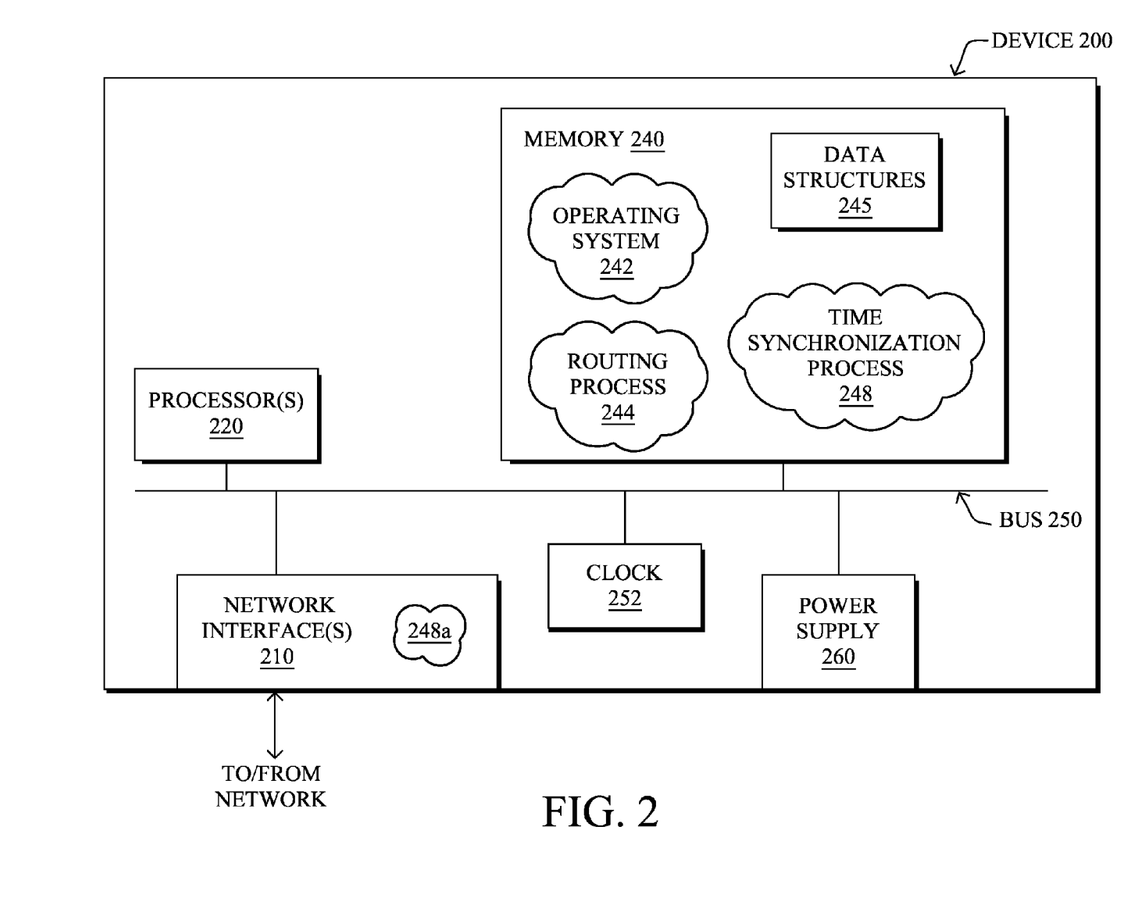
FIG. 2 illustrates an example network device/node.

FIG. 2 is a schematic block diagram of an example node/device 200 that may be used with one or more embodiments described herein, e.g., as any of the nodes/devices shown in FIG. 1 above. The device may comprise one or more network interfaces 210 (e.g., wired, wireless, power line communication, etc.), at least one processor 220, and a memory 240 interconnected by a system bus 250, an internal clock 252 (e.g., a hardware oscillator), as well as a power supply 260 (e.g., battery, plug-in, etc.).

The network interface(s) 210 include the mechanical, electrical, and signaling circuitry for communicating data over links 105 coupled to the network 110. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for power line communications (PLC) the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes/services may comprise routing process 244 and/or a time synchronization process 248, as described herein. Note that while process 248 is shown in centralized memory 240, alternative embodiments provide for the process to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Illustratively, the techniques described herein may be performed by hardware, software, and/or firmware, such as in accordance with the processes 244 and 248 shown in FIG. 2, which may include computer executable instructions executed by the processor 220 (or independent processor of interfaces 210) to perform functions relating to the techniques described herein. For example, the techniques herein may be treated as extensions to conventional protocols, such as the various communication and/or time synchronization protocols, and as such, may be processed by similar components understood in the art that execute those protocols, accordingly.

Routing process (services) 244 include computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Time synchronization process 248 includes instructions executable by processor 220 that cause device 200 to synchronize its internal timing mechanism using information received from a master device and/or to provide time information to any slaves of device 200 in a time synchronization deployment. For example, in the case of device 200 being a grandmaster device, time synchronization process 248 may generate timestamps based on clock 252 and broadcast this information as part of time synchronization messages. Conversely, in the case of device 200 being a slave device, time synchronization process 248 may adjust its own timekeeping mechanism based on the timing information received from its master device.

Figure 3:
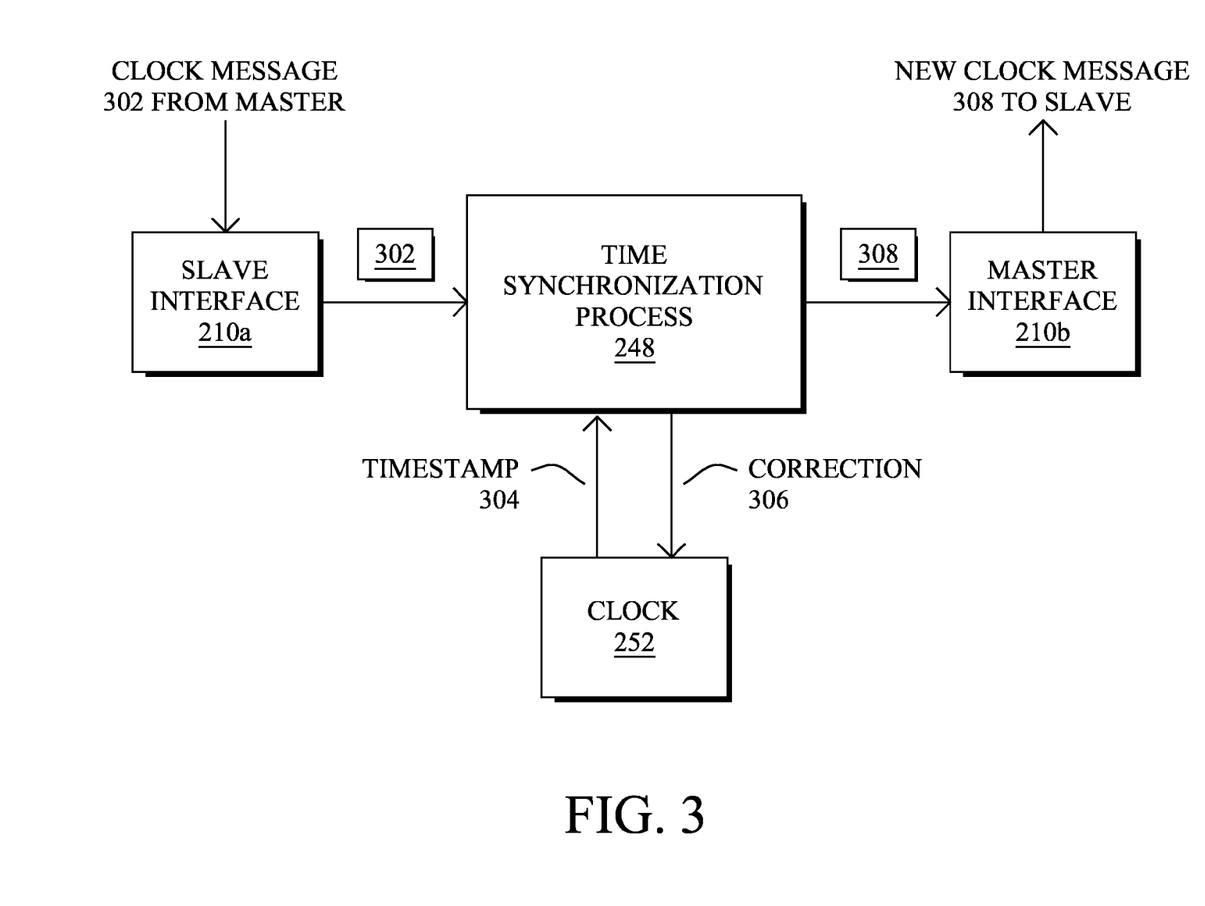
FIG. 3 illustrates an example architecture for performing time synchronization.

Referring now to FIG. 3, an example architecture for performing time synchronization is shown, according to various embodiments. Certain types of delays inherent to computer networks present challenges to synchronizing times across devices in a network. One type of delay that may affect the synchronization process is a queuing delay experienced by an intermediary device (e.g., a switch, a router, etc.). Typically, a device that forwards traffic within a network is only able to process a very limited number of packets at any given time. If the device receives more packets than it is able to handle, the device may store the unprocessed packets in a queue (e.g., a data structure) and process these packets as resources become available. Thus, the amount of time that the devices takes to forward any given packet is variable. In addition to queuing delays, transmission delays also present another challenge in the context of time synchronization. In particular, any given link between devices in the network may create a time offset between when a timestamp is advertised by a master device and when the advertisement is actually received by a slave device.

As shown, assume that the device receives a clock message 302 from a master/grandmaster device via a slave interface 210a. In various embodiments, clock message 302 may include a timestamp that indicates when clock message 302 was sent. In such a case, time synchronization process 248 may compare the timestamp information in clock message 302 to timestamp information 304 generated by device 200 (e.g., using information from the internal oscillator/clock 252). Based on the comparison, time synchronization process 248 may generate a correction 306 that synchronizes the internal timekeeping mechanism of process 248 to that of the master device.

In various embodiments, time synchronization process 248 may generate a new clock message 308, at some point after receiving clock message 302. Similar to clock message 302, clock message 308 may include timing information that is used by the one or more slave devices of device 200 to synchronize their timing mechanisms to that of device 200. For example, as shown, device 200 may provide the newly generated clock message 308 to its slave device via a master interface 210b. In various embodiments, the new clock message 308 generated by time synchronization process 248 may also take into account any delays associated with the transmission/reception of clock message 302 and/or the internal delays at device 200 between receiving clock message 302 and sending clock message 308.

Figure 4:
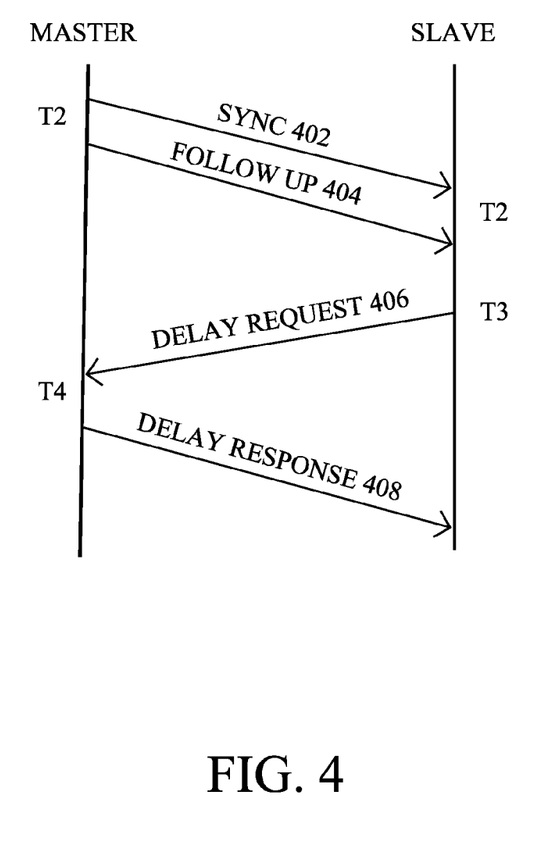
FIG. 4 illustrates an example set of clock messages that may be used to synchronize devices.

Referring now to FIG. 4, an example set of clock messages that may be used to synchronize devices is shown, according to various embodiments. As shown, a master device (e.g., one of servers 102, device 200, etc.) may send a synchronization (SYNC) message 402 (e.g., via its time synchronization process 248) that indicates to the slave device that time synchronization should occur. In some embodiments, the master may also send a subsequent follow-up message 404 that includes a timestamp that indicates time T1, which is the time at which SYNC message 402 was actually sent by the master. In other embodiments, the master device may include the T1 timestamp within the SYNC message 402, as part of a single step process.

In response to receiving the SYNC message 402, the slave device may generate a timestamp (e.g., timestamp 304 shown in FIG. 3) that indicates the reception time T2 at which the slave device received SYNC message 402. Thus, after receiving the T1 timestamp as part of follow up message 404 or within SYNC message 402, the slave device can precisely calculate the time difference between when SYNC message 402 was sent by the master device and when SYNC message 302 was received by the slave device (e.g., T2-T1).

In some embodiments, the slave device may generate and send a delay request 406 back to the master device. At the same time, the slave device may generate a third timestamp that represents the time T3 at which delay request 406 was sent. In response to receiving delay request 406, the master device may generate a timestamp that indicates the time T4 at which delay request 406 was received. In turn, the master device may include the T4 timestamp within a delay response 408 sent back to the slave device. Thus, after the delay request and response exchange, the slave device may compute a transmission delay from the slave to the master using the corresponding timestamps.

Referring again to FIG. 3, assume that time synchronization process 248 has received timestamps T1 and T4 via clock messages 302 from its master and generated timestamps T2 and T3 (e.g., timestamps 304) locally using its clock 252. To correct its own timing mechanism used to generate its own local timestamps, time synchronization process 248 may perform the following calculations:

$$\Delta T_{M \to S} = T2 - T1$$

$$\Delta T_{S \to M} = T4 - T3$$

$$\text{Correction } 306 = \frac{[\Delta T_{M \to S}] - [\Delta T_{S \to M}]}{2}$$

Time synchronization process 248 may use correction 306 to adjust its own timestamps, prior to generating and sending new clock messages 308 to its one or more slave devices. Notably, device 200 may send SYNC, follow up, and/or delay response messages to its slave device, in a manner similar to that described above. The slave device may then use the timestamps that it receives/generates regarding the messages to correct its own timing mechanism.

Typically, such as in IEEE-1588 implementations, the T1 and T4 timestamps sent by a master device to its slave within clock messages 308 are based on its own corrected, internal clock. In particular, IEEE-1588 provides for "boundary clocks" that serve as intermediary devices between a grandmaster and one or more purely slave devices. By using feedback from its master device, the intermediary device may adjust its own internal timing mechanism, and then using the corrected timing mechanism to synchronize its slaves to itself (e.g., by providing timestamps to the slaves based on its corrected clock). However, such a mechanism does not take into account frequency drift that may occur between the device's master or grandmaster and the device's own internal clock. Notably, deterministic and random local oscillator drift associated with clock 252 may limit the T1 and T4 timestamps provided by the device 200 to its slaves from being precisely synchronized with the time maintained by the grandmaster.

Referring now to FIGS. 5A-5D, an example is shown of a feed-forward time transfer mechanism that may be used to synchronize clocks across devices, according to various embodiments. According to the techniques herein, a feed-forward mechanism is introduced that accounts for any potential frequency drift in the local oscillator of an intermediary device. In particular, the timestamps sent by an intermediary device (e.g., device 200) located between a grandmaster and a pure slave may not be based on the locally corrected clock of the intermediary device. Instead, the intermediary device may send timestamps that are based on the timestamps received from the intermediary device's master, also taking into account the time difference between when the master sent the timestamp and when the intermediary device sends the new timestamp to its slave(s).

Figure 5A:
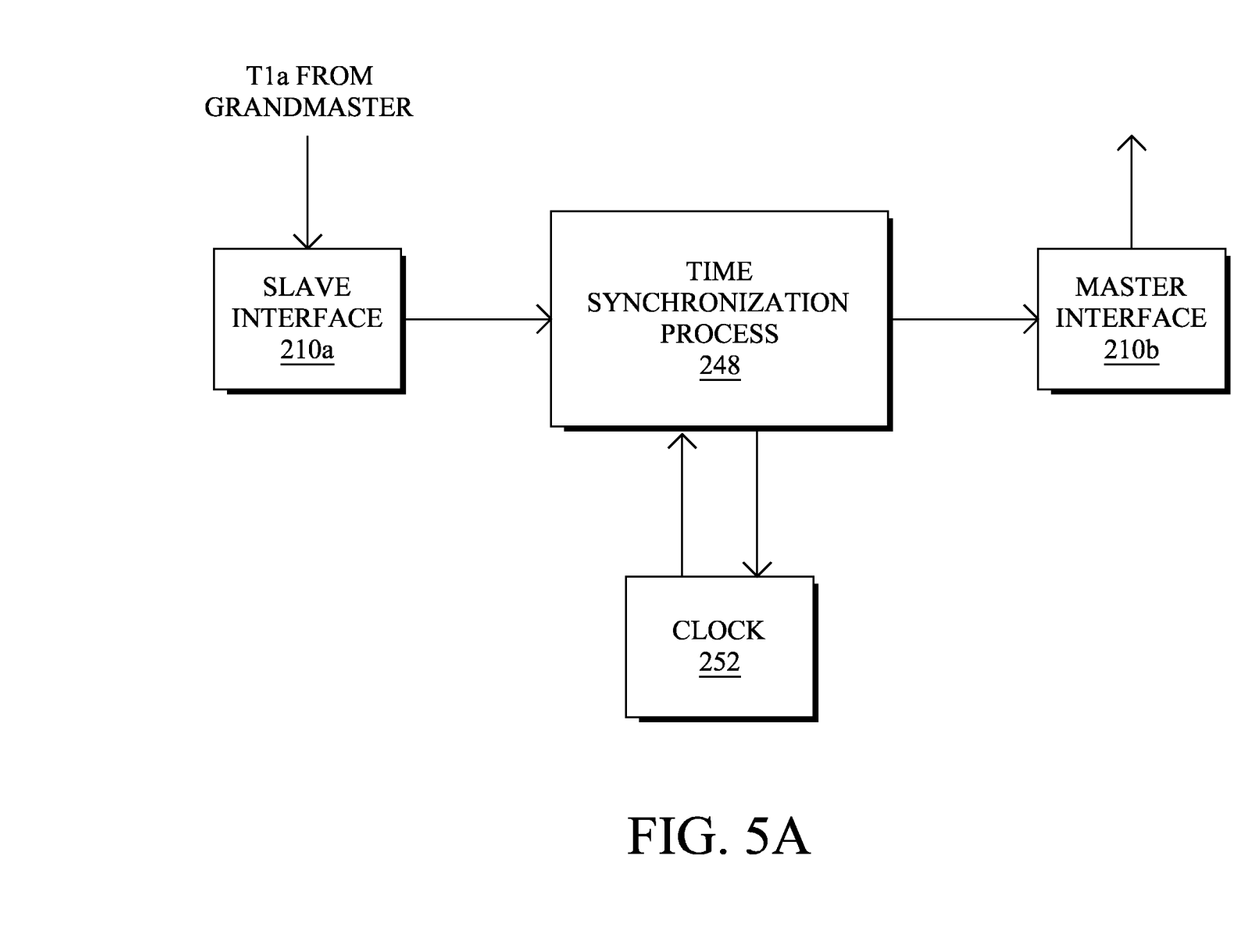
FIGS. 5A-5D illustrate an example of a feed-forward time transfer mechanism that may be used to synchronize clocks across devices.

As shown in FIG. 5A, assume that device 200 is an intermediary device between a grandmaster device (e.g., server 102) and is itself a master over one or more slave devices (e.g., client 104). In such a case, the grandmaster device may send a SYNC message (e.g., message 402) or a corresponding follow up message (e.g., message 404) that includes a timestamp T1a indicative of when the SYNC message was sent.

Figure 5B:
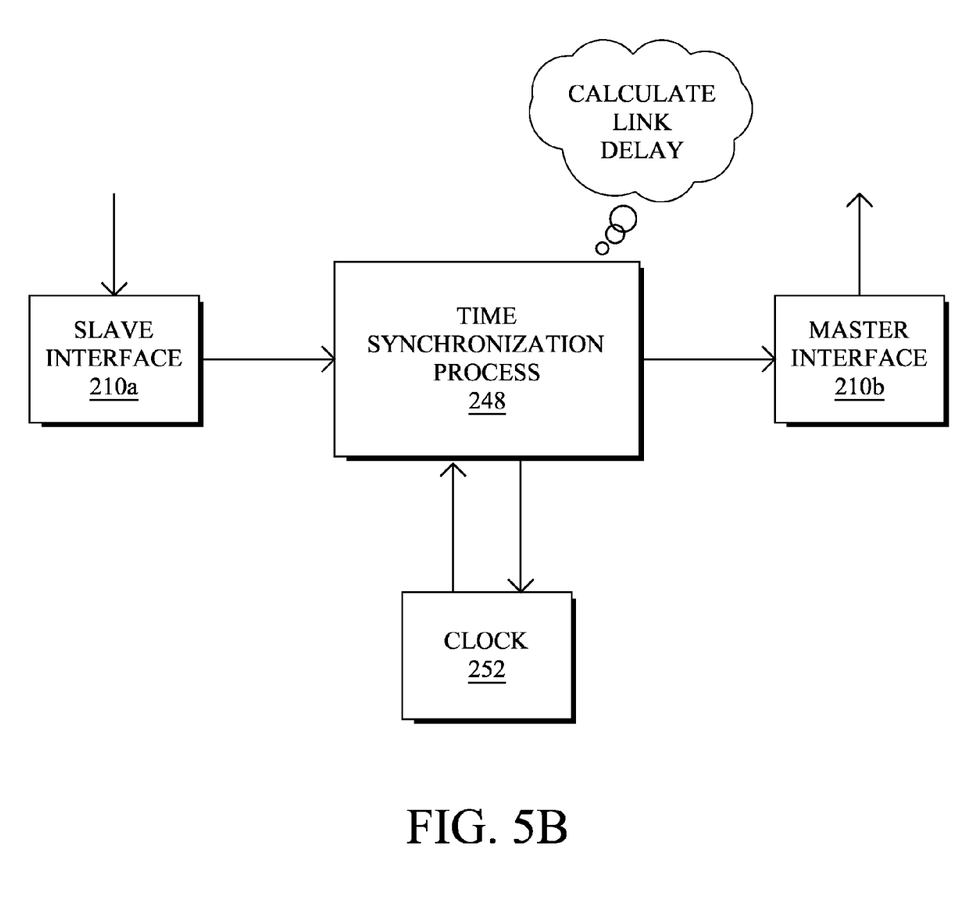

In FIG. 5B, time synchronization process 248 may calculate any transmission/link delays between the master of device 200 and the local device. For example, time synchronization process 248 may utilize a delay request and response mechanism, to determine the amount of delay associated with transmitting data between the master and device 200, in one embodiment (e.g., as illustrated in FIG. 4). In another embodiment, time synchronization process 248 may determine the amount of delay based solely on the difference in time between when the master sent the SYNC message and when the SYNC message was received by device 200 (e.g., T2-T1).

Figure 5C:
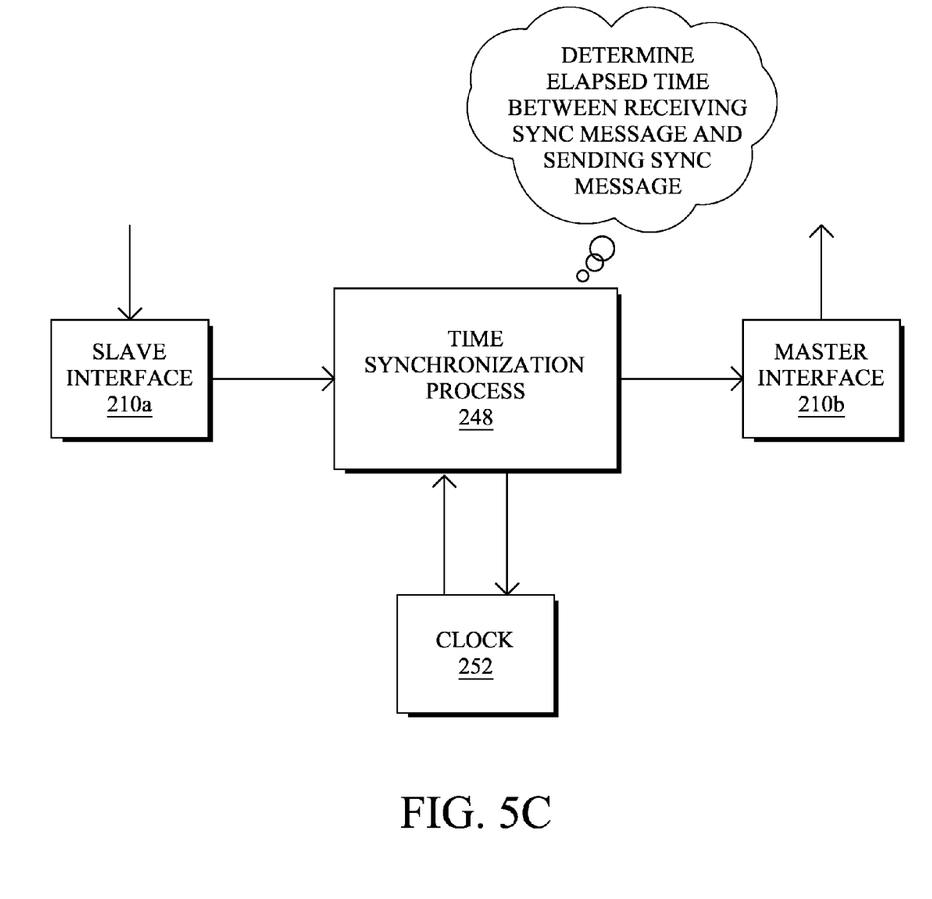

In FIG. 5C, time synchronization process 248 may also determine the amount of elapsed time between the SYNC message received from the master of device 200 and the time at which device 200 generates a new SYNC message for its one or more slaves. As noted previously, when device 200 acts in an intermediary capacity, it may generate a new SYNC message (e.g., a new clock message 308) for transmission to its one or more slaves after terminating the SYNC message received from its own master (e.g., clock message 302).

Figure 5D:
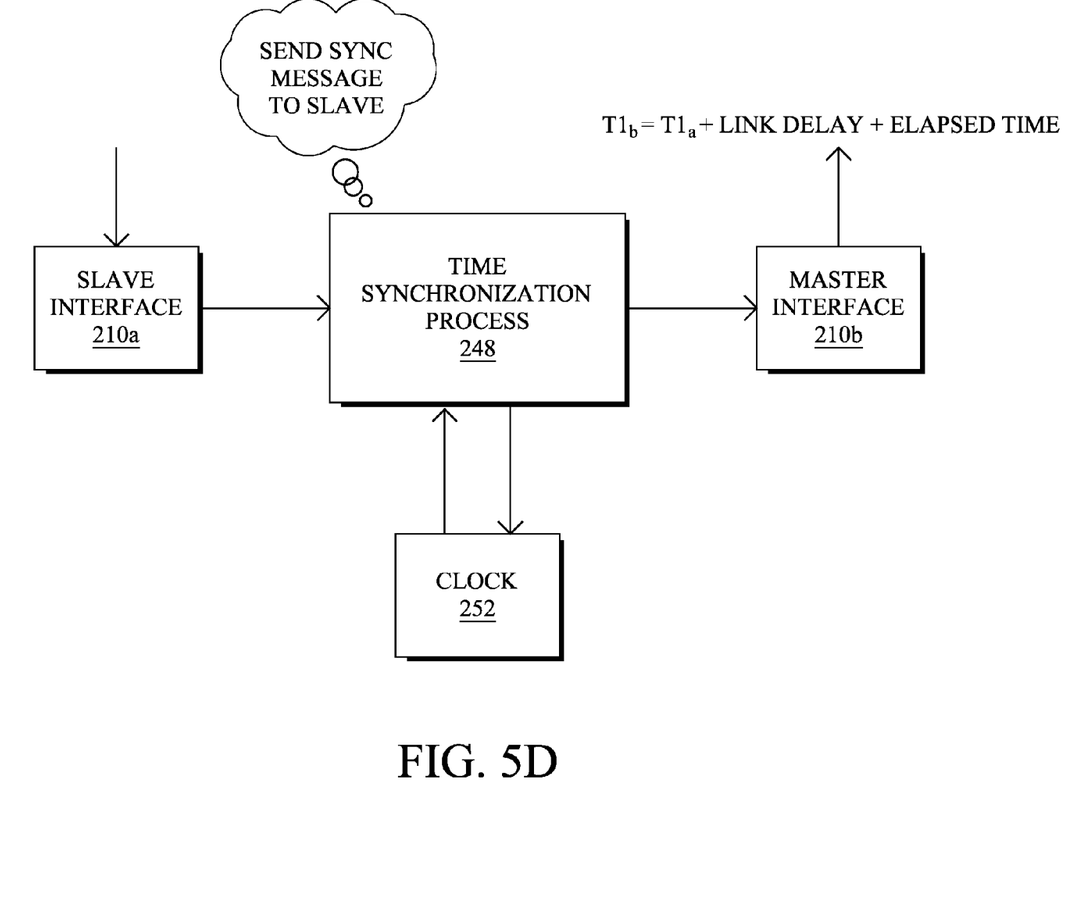

In FIG. 5D, time synchronization process 248 may send a new SYNC message to its one or more slave devices via master interface 210b. Associated with the new SYNC message may be a timestamp $T1_b$ that may be calculated as follows, in one embodiment:

$$T1_b = T1_a + \text{Link Delay} + \text{Elapsed Time}$$

where $T1_a$ is the timestamp received from the grandmaster/master of device 200 and associated with the SYNC message received by device 200 that indicates when the SYNC message was sent by the grandmaster/master, Link Delay quantifies the amount of transmission delay along the link from the grandmaster/master to device 200 (e.g., as determined in FIG. 5B), and Elapsed Time quantifies the amount of time between receiving the SYNC message from the grandmaster/master and sending a new SYNC message to the one or more slaves of device 200.

As would be appreciated, sending a new SYNC timestamp that is based on the previously received SYNC timestamp removes any potential synchronization errors that may exist between the timing mechanisms of the grandmaster/master and the intermediary device. In other words, updating the internal timing mechanism of the intermediary device based on the SYNC timestamp received from the grandmaster/master and then generating a new SYNC timestamp for the slave of the intermediary device creates the potential of there being difference in the timing mechanisms of the grandmaster/master and the intermediary device (e.g., due to oscillator drift). Instead, by offsetting the original timestamp sent by the grandmaster/master of the intermediary node, the intermediary node effectively provides a feed-forward control mechanism to its slaves when sending its own SYNC timestamp to its slaves.

In various embodiments, the feed-forward timestamp process detailed above may also be applied when sending delay responses (e.g., delay response 408). For example, in one embodiment, the $T4_b$ timestamp sent by device 200 to its slave as part of a delay response may be calculated as followed:

$$T4_b = T1_a + \text{Link Delay} + \text{Elapsed Time}$$

where $T1_a$ represents the time at which the SYNC timestamp was sent by the grandmaster/master to device 200, Link Delay is the amount of transmission delay associated with the link between the grandmaster/master and device 200, and Elapsed Time is the amount of time between when device 200 received the SYNC message from its grandmaster/master and when device 200 received the delay request from its slave device.

During preliminary testing, the feed-forward time transfer mechanism outlined herein demonstrated significant performance increases over that of a traditional approach in which an intermediary device adjusts its own local timing mechanism and uses the adjusted timing mechanism to send timestamps to its slave devices. In particular, during testing, the timing mechanism using the traditional approach demonstrated a time error of approximately 2,000 nanoseconds (ns). In contrast, the feed-forward approach detailed herein demonstrated a time error of approximately 100 ns.

Figure 6:
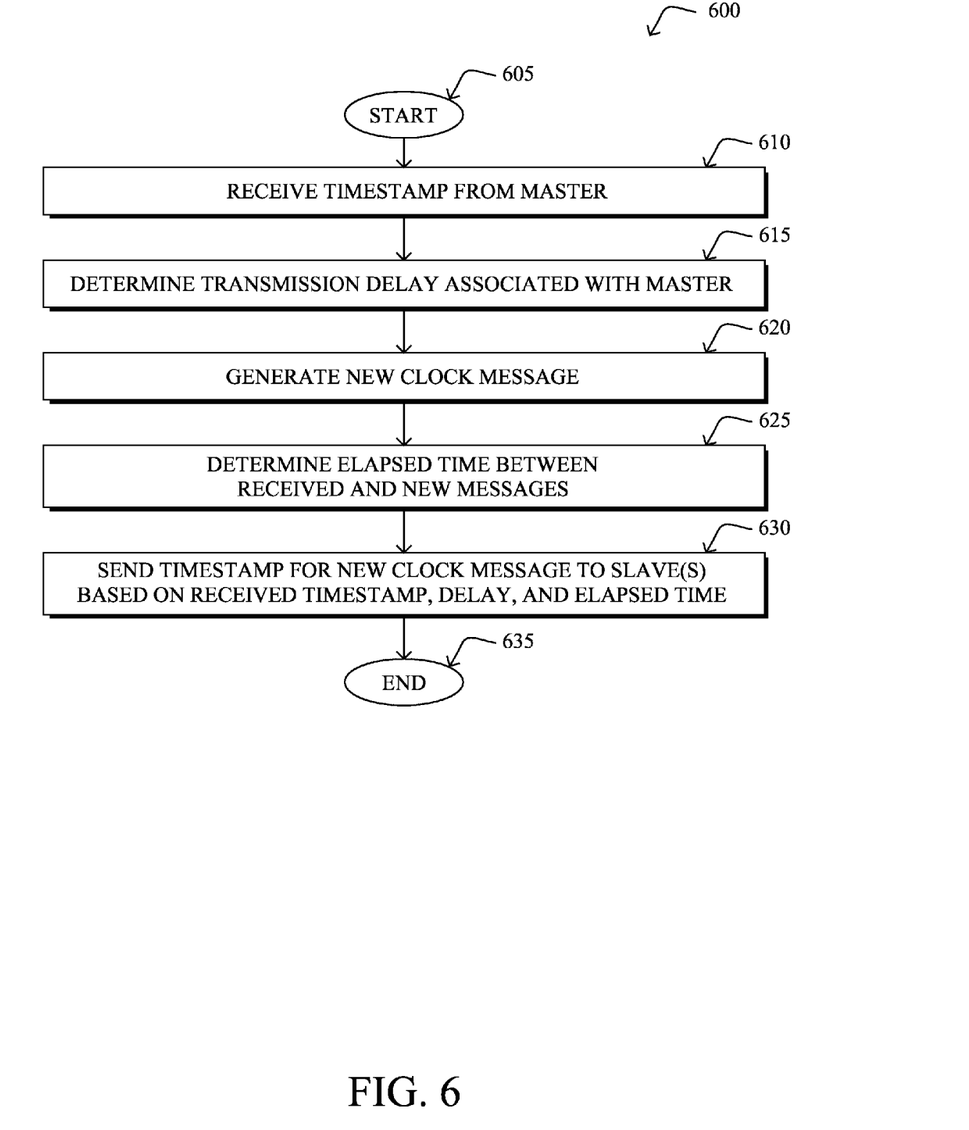
FIG. 6 illustrates an example simplified procedure for using a feed-forward time transfer mechanism to synchronize clocks across devices.

Referring now to FIG. 6, an example simplified procedure for using a feed-forward time transfer mechanism to synchronize clocks across devices is shown, in accordance with one or more embodiments described herein. In general, the procedure 600 may be performed by a computing device (e.g., device 200) by executing a time synchronization process (e.g., time synchronization process 248). Procedure 600 may begin at step 605 and continue on to step 610 where, as described in greater detail above, the device receives a timestamp from a master of the device. In general, as detailed above, a master in the context of time synchronization refers to any device that provides some form of control over the timing mechanism of another device. In various embodiments, the timestamp may be received from either a master device or from a grandmaster device (e.g., a device that is not a slave to any other device for purposes of time synchronization).

In some embodiments, the timestamp may be associated with a synchronization (SYNC) message sent by the master to the device. For example, the timestamp may indicate the time at which the SYNC message was sent by the master/grandmaster. In one embodiment, the timestamp may be sent as part of the SYNC message itself (e.g., generated on the fly). In another embodiment, the timestamp may be sent as part of a follow up message that is sent after the SYNC message.

At step 615, as described in greater detail above, the device determines a transmission delay associated with link between the device and its master. As would be appreciated, the physical properties of the link, external network conditions, and the like, may affect the amount of time between when a message is sent by the master and when the device receives the message. In one embodiment, the device may generate a timestamp, in response to receiving a message (e.g., a SYNC message, etc.) from the master, and use the generated timestamp to determine the amount of delay (e.g., by comparing the reception timestamp with the timestamp received in step 610). However, a delay calculated using only the sent and reception timestamps may not accurately represent the true amount of delay along the link.

In various embodiments, the device may determine the transmission/link delay between itself and its master by also measuring the amount of delay in the opposite direction. For example, the device may generate a timestamp when it sends a delay request to the master. In response to the request, the master/grandmaster may generate a reception timestamp and send the reception timestamp back to the device. The difference between the two timestamps thus quantifies the amount of delay in the opposite direction. In one embodiment, the device may then determine the overall delay for the link by averaging the determined delays in opposite directions.

At step 620, as detailed above, the device generates a new clock message for one or more of its slaves in the time synchronization process. For example, if the device is a boundary clock that implements IEEE-1588, it may generate a new SYNC message for its one or more slaves, in response to receiving a SYNC message from its own master. In other words, the device may terminate the clock message received from its master and, at some point in time later on, send a new clock message to its slave(s). Typically, the new clock message may be broadcast to the slaves by the device. However, in other embodiments, the new clock message may be sent as a unicast message to a particular slave.

At step 625, the device determines an elapsed time between when it received a clock message from its master and when it sent the new clock message to one or more of its slaves, as described in greater detail above. In various embodiments, the device may generate a first timestamp that represents when the device received the clock message from its master and a second timestamp that represents when the device sent the new clock message to its one or more slaves (e.g., the new clock message generated in step 620). The device may then calculate the elapsed time as the difference between these two timestamps.

At step 630, as detailed above, the device may send a timestamp that is associated with the new clock message sent by the device to one or more of its slaves. This timestamp may represent the time at which the device generated/sent the new clock message (e.g., a SYNC message, etc.) generated in step 620. According to various embodiments, the device may calculate this timestamp based on the timestamp received from its master in step 610, the transmission delay determined by the device in step 615, and/or on the elapsed time determined by the device in step 625. For example, the device may offset the timestamp received from its master with an amount of transmission delay between the device and its master, as well as with an offset that quantifies how long the device took to send a corresponding message to its one or more slaves. As would be appreciated, the slave(s) of the device may be true slaves or, alternatively, may be themselves masters over other slaves. In the latter case, the slaves of the device may also perform procedure 600 in a similar manner, using the timestamp sent by the device in step 630. Thus, the chain of devices may employ a feed-forward mechanism to synchronize their local times with that of a grandmaster. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a feed-forward time transfer mechanism whereby timestamp information from a grandmaster device may be propagated along a chain of devices to be synchronized to the clock of the grandmaster. Each subsequent device along the chain may generate new clock messages and associated timestamps that are calculated by offsetting the timestamp received from the device's master, thereby using feed-forward control, to synchronize the devices to the grandmaster.

While there have been shown and described illustrative embodiments that provide for the time synchronization of devices in a computer network, it is to be understood that various other adaptations and modifications may be made within the spirit and scope of the embodiments herein. For example, the embodiments have been shown and described herein primarily with respect to certain configurations. However, the embodiments in their broader sense are not as limited, and may, in fact, be used with other types of networks and/or protocols (e.g., wireless).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a device in a network, a timestamp from a time synchronization master of the device, wherein the timestamp is associated with a clock message received from the master;
   determining, by the device, an amount of transmission delay between the device and the master;
   generating, by the device, a new clock message for one or more slaves of the device;
   determining, by the device, an elapsed time between when the device received the clock message from the master and when the device generated the new clock message for the one or more slaves of the device; and
   sending, by the device, a new timestamp associated with the new clock message to the one or more slaves of the device, wherein the new timestamp includes the timestamp received from the master, the determined amount of transmission delay between the device and the master, and the elapsed time between when the device received the clock message from the master and when the device generated the new clock message.

2. The method as in claim 1, further comprising:
   calculating, by the device, the new timestamp by summing the timestamp received from the master, the determined amount of transmission delay, and the elapsed time between when the device received the clock message from the master and when the device generated the new clock message.

3. The method as in claim 1, wherein determining the amount of transmission delay between the device and the master comprises:
   sending, by the device, a delay request message to the master;
   generating, by the device, a timestamp indicative of when the delay request message was sent;
   receiving, at the device, a delay response message from the master that includes a timestamp indicative of when the master received the delay request message; and
   using the timestamps indicative of when the delay request message was sent and received to compute the amount of transmission delay between the device and the master.

4. The method as in claim 1, wherein the master is a time synchronization grandmaster.

5. The method as in claim 1, wherein the device is a networking router or a networking switch.

6. The method as in claim 1, further comprising:
   updating, by the device, a local timing mechanism of the device using the timestamp received from the master.

7. The method as in claim 1, wherein the clock message received from the master and the new clock message sent by the device to the one or more slaves of the device are time synchronization messages.

8. The method as in claim 1, further comprising:
   receiving, at the device, a delay request message from a particular one of the one or more slaves;
   calculating, by the device, a timestamp indicative of when the device received the delay request message from the particular slave by summing the timestamp received from the time synchronization master, the amount of transmission delay between the device and the master, and an elapsed time that corresponds to the amount of time from when the device received the clock message from the master; and
   providing, by the device, the timestamp indicative of when the device received the delay request to the particular slave.

9. An apparatus, comprising:
   one or more network interfaces to communicate with a network;
   a processor coupled to the network interfaces and configured to execute one or more processes; and
   a memory configured to store a process executable by the processor, the process when executed operable to:
      receive a timestamp from a time synchronization master of the apparatus, wherein the timestamp is associated with a clock message received from the master;
      determine an amount of transmission delay between the apparatus and the master;
      generate a new clock message for one or more slaves of the apparatus;
      determine an elapsed time between when the apparatus received the clock message from the master and when the apparatus generated the new clock message for the one or more slaves of the apparatus; and
      send a new timestamp associated with the new clock message to the one or more slaves of the apparatus, wherein the new timestamp includes the timestamp received from the master, the determined amount of transmission delay between the apparatus and the master, and the elapsed time between when the apparatus received the clock message from the master and when the apparatus generated the new clock message.

10. The apparatus as in claim 9, wherein the process when executed is further operable to:
    calculate the new timestamp by summing the timestamp received from the master, the determined amount of transmission delay, and the elapsed time between when the apparatus received the clock message from the master and when the apparatus generated the new clock message.

11. The apparatus as in claim 9, wherein the amount of transmission delay between the apparatus and the master is determined by:
    sending a delay request message to the master;
    generating a timestamp indicative of when the delay request message was sent;
    receiving a delay response message from the master that includes a timestamp indicative of when the master received the delay request message; and
    using the timestamps indicative of when the delay request message was sent and received to compute the amount of transmission delay between the apparatus and the master.

12. The apparatus as in claim 9, wherein the master is a time synchronization grandmaster.

13. The apparatus as in claim 9, wherein the apparatus is a networking router or a networking switch.

14. The apparatus as in claim 9, wherein the process when executed is further operable to:
    update a local timing mechanism of the apparatus using the timestamp received from the master.

15. The apparatus as in claim 9, wherein the clock message received from the master and the new clock message sent by the apparatus to the one or more slaves of the apparatus are time synchronization messages.

16. The apparatus as in claim 9, wherein the process when executed is further operable to:

receive a delay request message from a particular one of the one or more slaves;

calculate a timestamp indicative of when the apparatus received the delay request message from the particular slave by summing the timestamp received from the time synchronization master, the amount of transmission delay between the apparatus and the master, and an elapsed time that corresponds to the amount of time from when the apparatus received the clock message from the master; and provide the timestamp indicative of when the apparatus received the delay request to the particular slave.

17. A tangible, non-transitory, computer-readable media having software encoded thereon, the software when executed by a processor of a device operable to:

receive a timestamp from a time synchronization master of the device, wherein the timestamp is associated with a clock message received from the master;

determine an amount of transmission delay between the device and the master;

generate a new clock message for one or more slaves of the device;

determine an elapsed time between when the device received the clock message from the master and when the device generated the new clock message for the one or more slaves of the device; and send a new timestamp associated with the new clock message to the one or more slaves of the device, wherein the new timestamp includes the timestamp received from the master, the determined amount of transmission delay between the device and the master, and the elapsed time between when the device received the clock message from the master and when the device generated the new clock message.

18. The computer-readable media as in claim 17, wherein the software when executed is further operable to:

calculate the new timestamp by summing the timestamp received from the master, the determined amount of transmission delay, and the elapsed time between when the device received the clock message from the master and when the device generated the new clock message.

19. The computer-readable media as in claim 17, wherein the amount of transmission delay is determined by:

sending a delay request message to the master;

generating a timestamp indicative of when the delay request message was sent;

receiving a delay response message from the master that includes a timestamp indicative of when the master received the delay request message; and using the timestamps indicative of when the delay request message was sent and received to compute the amount of transmission delay between the device and the master.

20. The computer-readable media as in claim 17, wherein the software when executed is further operable to:

receive a delay request message from a particular one of the one or more slaves;

calculate a timestamp indicative of when the device received the delay request message from the particular slave by summing the timestamp received from the time synchronization master, the amount of transmission delay between the device and the master, and an elapsed time that corresponds to the amount of time from when the device received the clock message from the master; and provide the timestamp indicative of when the device received the delay request to the particular slave.

\* \* \* \* \*